(12) United States Patent
Niemeyer et al.

(10) Patent No.: US 11,396,005 B2
(45) Date of Patent: Jul. 26, 2022

(54) CATALYST SUPPORT COMPRISING HOMOGENEOUSLY DISTRIBUTED TITANIUM DIOXIDE AND METHOD FOR PRODUCTION

(71) Applicant: Sasol Germany GmbH, Hamburg (DE)

(72) Inventors: Dirk Niemeyer, Halstenbek (DE); Hans-Jorg Wolk, Hamburg (DE); Katharina Goroll, Herzhorn (DE); Marcos Schoneborn, Hamburg (DE); Martin Kuhn, Brunsbuttel (DE)

(73) Assignee: Sasol Germany GmbH, Hamburg (DE)

( * ) Notice: Subject to any disclaimer, the term of this patent is extended or adjusted under 35 U.S.C. 154(b) by 71 days.

(21) Appl. No.: 16/956,936

(22) PCT Filed: Jan. 21, 2019

(86) PCT No.: PCT/EP2019/051392
§ 371 (c)(1),
(2) Date: Jun. 22, 2020

(87) PCT Pub. No.: WO2019/141848
PCT Pub. Date: Jul. 25, 2019

(65) Prior Publication Data
US 2020/0391183 A1     Dec. 17, 2020

(30) Foreign Application Priority Data

Jan. 22, 2018 (EP) .................................. 18152854

(51) Int. Cl.
*B01J 21/06* (2006.01)
*B01J 21/04* (2006.01)
*B01J 23/34* (2006.01)
*B01J 35/02* (2006.01)
*B01J 37/02* (2006.01)
*B01J 37/08* (2006.01)

(52) U.S. Cl.
CPC ............. *B01J 21/063* (2013.01); *B01J 21/04* (2013.01); *B01J 23/34* (2013.01); *B01J 35/026* (2013.01); *B01J 37/0203* (2013.01); *B01J 37/0207* (2013.01); *B01J 37/0236* (2013.01); *B01J 37/086* (2013.01)

(58) Field of Classification Search
CPC . B01J 21/04; B01J 21/063; B01J 23/34; B01J 35/026; B01J 37/0203; B01J 37/0207; B01J 37/0236; B01J 37/086
See application file for complete search history.

(56) References Cited

U.S. PATENT DOCUMENTS

| | | | | |
|---|---|---|---|---|
| 5,268,152 A | * | 12/1993 | Delzer | B01D 53/52 423/210 |
| 2001/0012816 A1 | * | 8/2001 | Yamaguchi | B01J 35/08 502/8 |
| 2005/0124490 A1 | | 6/2005 | Timken | |

FOREIGN PATENT DOCUMENTS

| WO | 2004035511 | 4/2004 |
|---|---|---|
| WO | 2017074909 | 5/2017 |

* cited by examiner

*Primary Examiner* — Brian A McCaig
(74) *Attorney, Agent, or Firm* — Bushman Werner, P.C.

(57) ABSTRACT

The present invention relates a method of making a catalyst support comprising at least homogeneously distributed titanium dioxide and alumina and to a catalyst support obtained according to this method.

14 Claims, 2 Drawing Sheets

Figure 1:
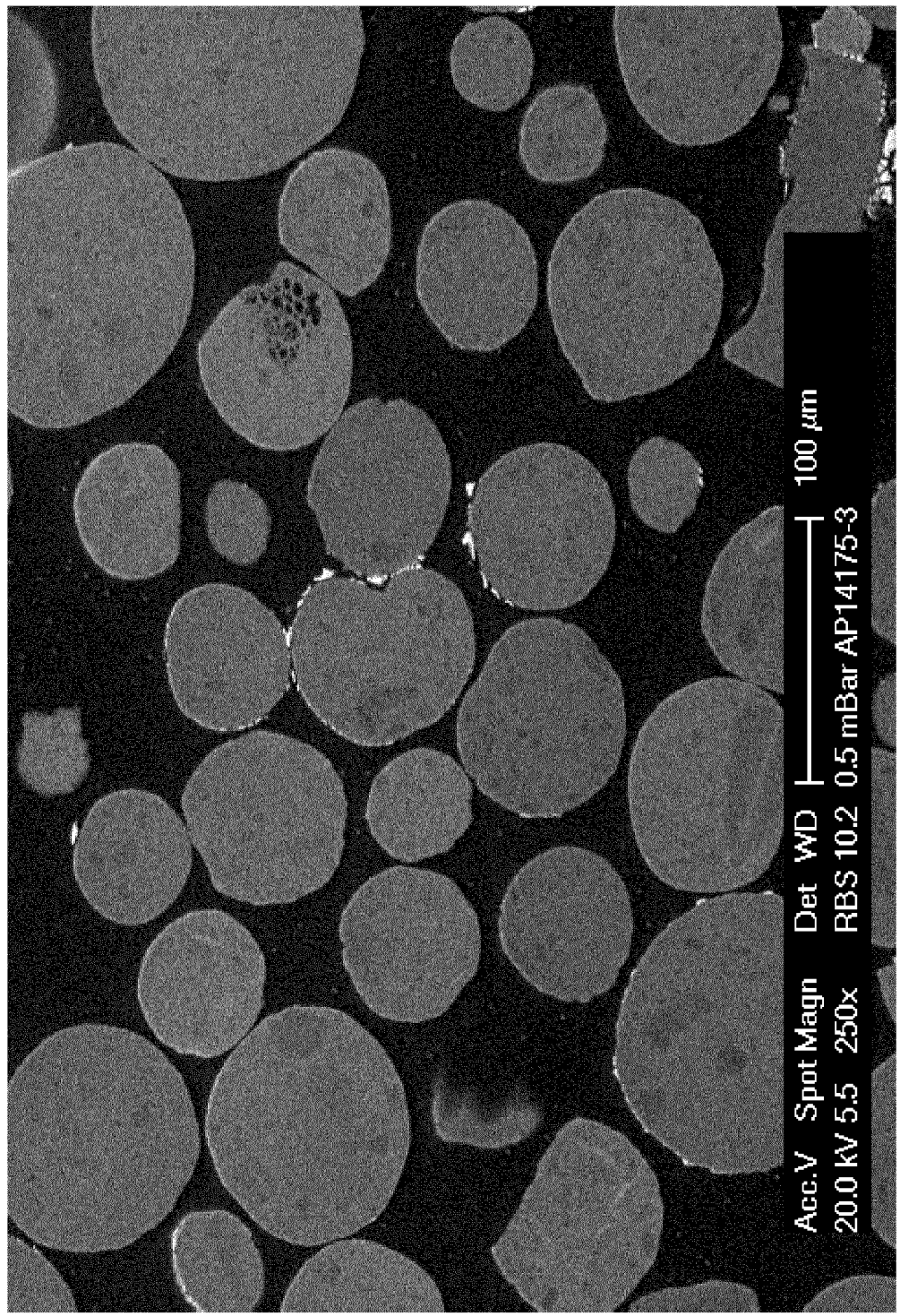

CATALYST SUPPORT COMPRISING HOMOGENEOUSLY DISTRIBUTED TITANIUM DIOXIDE AND METHOD FOR PRODUCTION

FIELD OF THE INVENTION

This invention relates a method of making a catalyst support comprising at least homogeneously distributed titanium dioxide and alumina and to a catalyst support prepared by such method.

BACKGROUND ART

WO 2014/020507 A2 describes a method of incorporating a titanium compound into a catalyst support material by means of impregnation. A suitable impregnating liquid medium may be used to effect the contact between the titanium compound and the catalyst support material. The examples of WO 2014/020507 A2 disclose the use of ethanol as an organic liquid medium to contact the catalyst support material with a titanium compound during preparation of the titanium compound modified catalyst support. Although not exemplified, WO 2014/020507 A2 also discloses that an inorganic liquid medium such as water may be used to contact the catalyst support material with the titanium compound.

WO 2013/114098 A1 discloses a method where an aqueous composition of a carboxylic acid and a titanium compound is prepared and simultaneously added to a catalyst support material i.e. it is a mixture of titanium compound and carboxylic acid that is added to the catalyst support material.

US 2005/0124490 discloses a homogeneous, amorphous catalyst support comprising a modifying-metal-oxide and a base-metal oxide in which the modifying-metal-oxide is homogeneously distributed throughout the base-metal oxide. US 2005/0124490 describes a precipitation process in which alumina salts are used as feedstocks in order to produce modified alumina.

The preparation methods of the prior art either differ or result in catalysts where the titanium compound is not homogeneously dispersed on the catalyst support. The need therefore exists to improve such methods.

DISCLOSURE OF THE INVENTION

According to a first aspect of the invention there is provided a method of preparing a catalyst support, the method comprising:
i) preparing an alumina suspension, the alumina suspension having a pH of between 6 and 8; wherein the alumina suspension comprises an alumina selected from the group consisting of transition alumina, boehmite and mixtures thereof and is preferably γ-alumina;
ii) preparing a titanium compound solution;
iii) adding an acid to the alumina suspension until the pH of the alumina suspension is between 4 and 5 to form an acid modified alumina suspension; and
iv) adding the titanium compound solution to the acid modified alumina suspension to form an alumina/titanium compound suspension.

The method may include a further step of adding an acid to the alumina/titanium compound suspension to form an acid modified alumina/titanium compound suspension.

The method may include a further step of heating the alumina/titanium compound suspension or the acid modified alumina/titanium compound suspension to form a heated alumina/titanium compound suspension or a heated acid modified alumina/titanium compound suspension. Heating occurs at a temperature range of between 30° C. and 70° C., typically around 50° C. for a period of between 2 and 4 hours.

The method may include a step of drying the heated alumina/titanium compound suspension or the heated acid modified alumina/titanium compound suspension.

The method may include a step of drying the acid modified alumina suspension before adding the titanium compound solution to form a dried alumina acid modified mixture.

According to a first option for the first aspect of the invention there is provided a method of preparing a catalyst support, the method comprising:
i) preparing an alumina suspension, the alumina suspension having a pH of between 6 and 8; wherein the alumina suspension comprises an alumina selected from the group consisting of transition alumina, boehmite and mixtures thereof and is preferably γ-alumina;
ii) preparing a titanium compound solution;
iii) adding an acid to the alumina suspension until the pH of the alumina suspension is between 4 and 5 to form an acid modified alumina suspension;
iv) adding the titanium compound solution to the acid modified alumina suspension to form an alumina/titanium compound suspension; and
v) drying the alumina/titanium compound suspension to form a dried alumina/titanium compound mixture.

According to a second option for the first aspect of the invention there is provided a method of preparing a catalyst support, the method comprising:
i) preparing an alumina suspension, the alumina suspension having a pH of between 6 and 8; wherein the alumina suspension comprises an alumina selected from the group consisting of transition alumina, boehmite and mixtures thereof and is preferably γ-alumina;
ii) preparing a titanium compound solution;
iii) adding an acid to the alumina suspension until the pH of the alumina suspension is between 4 and 5 to form an acid modified alumina suspension;
iv) adding the titanium compound solution to the acid modified alumina suspension to form an alumina/titanium compound suspension;
v) adding an acid to the alumina/titanium compound suspension to form an acid modified alumina/titanium compound suspension; and
vi) drying the acid modified alumina/titanium compound suspension to form a dried pH modified alumina/titanium compound mixture.

The first option and second option for the first aspect of the invention may include the further step of heating the alumina/titanium compound suspension or the acid modified alumina/titanium suspension. The heating may occur at a temperature range of between 30° C. and 70° C., typically around 50° C., and preferably for a period of between 2 and 4 hours.

Where the method of the invention does not include the step of drying the acid modified alumina suspension before the addition of the titanium compound solution then the acid added to the alumina suspension is preferably formic acid, lactic acid, citric acid, or mixtures thereof, more preferably lactic acid, citric acid, or mixtures thereof and most preferably citric acid.

The percentage of acid added to the alumina suspension may be between 5 and 30 wt % of the acid modified alumina suspension, preferably between 5 and 20 wt % of the acid modified alumina suspension. However, it is to be appreciated that the amount of acid added must be sufficient to drop the pH of the alumina suspension from a pH of between 6 and 8 to a pH of between 4 and 5.

According to a third option for the first aspect of the invention there is provided a method of preparing a catalyst support, the method comprising:

i) preparing an alumina suspension, the alumina suspension having a pH of between 6 and 8; wherein the alumina suspension comprises an alumina selected from the group consisting of transition alumina, boehmite and mixtures thereof and is preferably γ-alumina;

ii) preparing a titanium compound solution;

iii) adding an acid to the alumina suspension until the pH of the alumina suspension is between 4 and 5 to form an acid modified alumina suspension;

iv) drying the acid modified alumina suspension to form a dried alumina acid modified mixture;

v) adding the titanium compound solution to the dried alumina acid modified mixture to form an alumina/titanium compound suspension; and vi) drying the alumina/titanium compound suspension to form a dried alumina/titanium compound mixture.

According to a fourth option for the first aspect of the invention there is provided a method of preparing a catalyst support, the method comprising:

i) preparing an alumina suspension, the alumina suspension having a pH of between 6 and 8; wherein the alumina suspension comprises an alumina selected from the group consisting of transition alumina, boehmite and mixtures thereof and is preferably γ-alumina;

ii) preparing a titanium compound solution;

iii) adding an acid to the alumina suspension until the pH of the alumina suspension is between 4 and 5 to form an acid modified alumina suspension;

iv) drying the acid modified alumina suspension to form a dried alumina acid modified mixture;

v) adding the titanium compound solution to the dried alumina acid modified mixture to form an alumina/titanium compound suspension;

vi) adding an acid to the alumina/titanium compound suspension to form an acid modified alumina/titanium compound suspension; and vii) drying the acid modified alumina/titanium compound suspension to form a dried acid modified alumina/titanium compound mixture.

The third option and fourth option for the first aspect of the invention may include the further step of heating the alumina/titanium compound suspension or the acid modified alumina/titanium compound suspension. The heating may occur at a temperature range of between 30° C. and 70° C., typically around 50° C., and preferably for a period of between 2 and 4 hours.

It will be appreciated that the amount of acid added in step vi) of the fourth option of the first aspect of the invention is sufficient to ensure that the pH of the alumina/titanium compound suspension is kept at a pH of between 4 and 5.

Where the method of the invention includes drying the acid modified alumina suspension before the addition of the titanium compound solution then the acid added is preferably a carboxylic acid (an organic compound that contains at least one carboxyl group (C(=O)OH)) comprising formic acid, lactic acid, citric acid, or mixtures thereof.

The percentage acid added to the alumina suspension is between 5 and 30 wt % of the acid modified alumina suspension, preferably 5 and 20 wt % of the acid modified alumina suspension. However, it will be appreciated that the amount of acid added must be sufficient to drop the pH of the alumina suspension from a pH of between 6 and 8 to a pH of between 4 and 5.

It is preferred not to dry the acid modified alumina suspension before the addition of the titanium compound solution, for example as per the first and second options of the first aspect of the invention (known as equilibrium deposition filtration "EDF") over drying the acid modified alumina suspension before the addition of the titanium compound solution as per the third and fourth options of the first aspect of the invention (known as incipient wetness "IW").

The method (and options) of the first aspect of the invention may include a final step of calcining the dried alumina/titanium compound mixture or the dried acid modified alumina/titanium compound mixture. Calcination is carried out at temperatures typically between 100° C. and 1000° C., preferably between 400° C. and 600° C., each preferably for a period of between 2 and 5 hours to produce a calcined catalyst support.

The transition alumina preferably is γ-alumina (gamma), δ-alumina (delta), θ-alumina (theta) or mixtures thereof. Most preferably the transition alumina is γ-alumina.

The alumina suspension is preferably prepared by suspending an alumina selected from the group consisting of transition alumina, boehmite and mixtures thereof and is preferably γ-alumina; in at least water. The percentage of the alumina in the suspension is between 5 and 60% relative to the whole alumina suspension, preferably between 40 and 50% relative to the whole alumina suspension.

Preferably the alumina in the alumina suspension is exclusively alumina selected from the group consisting of transition alumina, boehmite and mixtures thereof and preferably is exclusively γ-alumina.

The titanium compound solution is prepared by dissolving a titanium precursor in at least water. Water soluble titanium precursors comprising potassium titanium oxalates, ammonium titanium oxalates, ammonium titanium lactates, or mixtures thereof can be used. If required, the temperature of the at least water can be increased to 90° C. in order to accelerate the dissolution process. The concentration of the titanium precursor in the solution should be as high as possible and only confined by the solubility of the titanium precursor in the at least water. A preferred titanium solution is an aqueous solution of potassiumtitanyloxalate dehydrate made with 1% to 4% wt. calculated as $TiO_2$. The titanium solution can be magnetically stirred for about 30 minutes before being added to the alumina suspension. The titanium solution is preferably run through an ion exchange column in order to remove any impurities, for example potassium before being added to the alumina suspension. Therefore, the titanium solution is preferably magnetically stirred for a period of time and (also independently therefrom) run through an ion exchange column before being added to the alumina suspension.

Any drying methods which are known in the art of the invention can be utilised for the method of the invention. Drying is typically carried out for 0.5 to 5 hours at a temperature of between 80° C. and 120° C.

The alumina/titanium compound suspension comprises 99 to 95 wt. % alumina, most preferably 97 to 99 wt. %, calculated as $Al_2O_3$, and preferably 1 to 5 wt. %, most preferably 1 to 3 wt. %, of titanium compounds, calculated as $TiO_2$, relative to sum of alumina, calculated as $Al_2O_3$, and titanium compounds, calculated as $TiO_2$.

The dried (including acid/pH modified) alumina/titanium compound mixture comprises preferably 99 to 95 wt. %, most preferably 99 to 97 wt. %, alumina, calculated as $Al_2O_3$, and preferably 1 to 5 wt. %, most preferably 1 to 3 wt. %, titanium compounds, calculated as $TiO_2$, relative to the total dried (including acid/pH modified) alumina/titanium compound mixture.

According to a second aspect of the invention there is provided a catalyst support prepared according to the first aspect of the invention.

According to a third aspect of the invention there is provided a calcined catalyst support comprising an alumina support coated with between 1 and 5 wt. % $TiO_2$ in relation to the alumina support ($Al_2O_3$), the $TiO_2$ being homogeneously dispersed on the alumina support.

By "coating/coated" is meant a surface covering formed over the support material, including coating of surfaces of inner pore walls of the support material (but not within a bulk of the support).

The catalyst support preferably comprises an alumina support coated with between 3 and 5 wt. % $TiO_2$ (measured after calcination) in relation to the alumina support ($Al_2O_3$).

The wt % of $TiO_2$ in the catalyst support prepared according to the first aspect of the invention is expressed in terms of the total weight of the catalyst support.

Most surprisingly it has been found that if the alumina suspension is first treated with acid(s), prior to contacting the alumina suspension with the titanium compound solution, improved homogeneous distribution of the titanium compound on the alumina catalyst support is achieved.

According to a fourth aspect of the invention there is provided a method of preparing a promoted catalyst support the method comprising:
  i) preparing a catalyst support according to the first aspect of the invention; and
  ii) introducing a promoter onto and/or into the catalyst support thereby to obtain a promoted catalyst support.

The promoter is preferably a manganese compound including for example manganese hydroxides, manganese oxides and/or manganese oxihydroxides. The manganese may be added to the catalyst support with the titanium compound solution i.e. by mixing a manganese precursor, for example manganese acetate, with the titanium compound solution of step ii) of the first aspect of the invention. Alternatively, the calcined catalyst support may be impregnated with a manganese precursor, for example manganese acetate.

The fourth aspect of the invention may include a final step of calcination.

A catalyst support or promoted catalyst support prepared according to the invention may be used for Fischer-Tropsch catalysts, hydrocarbon synthesis catalysts, hydro-desulfurisation catalysts, hydrotreating catalysts and photocatalysts for NO oxidation, amongst others.

Figure 2:
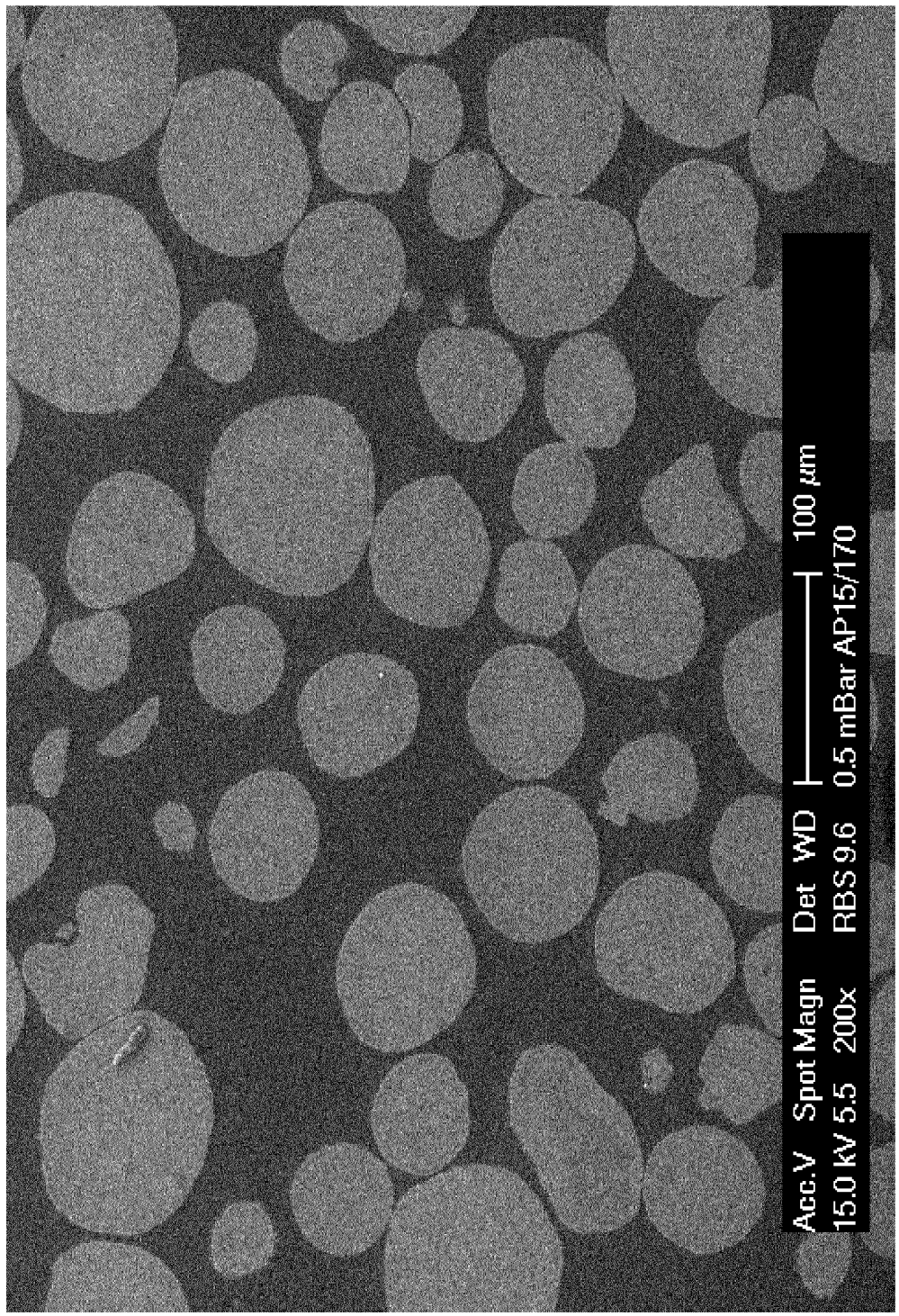

The invention will now be described in more detail with reference to the accompanying drawings and the following non-limiting examples where:

FIG. 1 is a cross-sectional SEM image of Comparative Example 3 wherein white spots represent $TiO_2$ enrichment; and FIG. 2 is a cross-sectional SEM of Example 3.

EXPERIMENTAL

The titanium(IV) bis(ammonium lactato) dihydroxide (TALH) used is a 1 wt % aqueous solution of TALH known in the trade as Tyzor® LA (calculated as $TiO_2$).

In the examples below the wt % of Ti calculated as $TiO_2$ in the catalyst support is expressed in terms of the total weight of the catalyst support.

X-ray photoelectron spectroscopy (XPS) was used in the examples below to determine the $TiO_2$ distribution on the alumina surface. XPS is a surface-sensitive quantitative spectroscopic technique that measures the elemental composition at the parts per thousand parts range. Since XPS is only surface sensitive, the samples were analysed by XPS both as received (particle as is) and after being ground (crushed) using a pestle and mortar and the ratios of elements were reported. Approximately the same amount of sample was used for the grinding step (compared to the samples where the particles as is were measured) using a pestle and mortar with only just enough force being applied to break down the particles.

The XPS spectra were recorded on the KRATOS Axis Ultra DLD, with the analyser operating at the fixed pass energy of 160 eV for the survey spectrum and 20 eV for the individual regions. The measurements were carried out using the Al Kα monochromated source. Due to the nature of the materials, neutralisation was necessary during the acquisition. All the spectra were corrected in energy using the C 1s at 284.6 eV. All the samples were mounted as loose powders in a molybdenum sample holder. The peak area ratios as determined by XPS for all the support samples in the Examples are provided in Tables 1, 2, and 3 together with the calculated difference between the particle as is and the crushed sample. The larger this difference the less homogeneous is the sample. Homogeneous samples show very small or even negative values.

Examples—Options 1 and 2 of the First Aspect of the Invention

As described hereinbefore options 1 and 2 of the first aspect of the invention do not include the step of drying the acid modified alumina suspension before addition of the titanium compound solution (known as Equilibrium Deposition Filtration (hereinafter "EDF")).

Comparative Example 1: TALH Equilibrium Deposition Filtration (Hereinafter "EDF") with No Acid Addition 38.8 g Puralox SCCa-150 was suspended in 46.5 g water to obtain a 45.5 wt % $Al_2O_3$ in water suspension. 164 g of a TALH aqueous solution (1 wt-% $TiO_2$) was added to the alumina suspension and heated for 3 hours at 50° C., filtered, dried and calcined at 550° C. The resulting modified support included 1.1 wt % $TiO_2$ (based on the total weight of the modified support).

Comparative Example 2—Same Process as Described in WO 2013/114098 A1: 1 Step TALH EDF with Citric Acid—Premix 38.6 g Puralox SCCa-150 was suspended in 46 g water (45.5 wt % suspension). 160 g of a mixed solution of TALH and citric acid was added to the suspension (1 wt % $TiO_2$=11 g TALH, 20 wt % citric acid related to the amount of TALH used=2.2 g). The mixture was heated, stirred at 50° C. for 3 h, filtered, dried and calcined at 550° C. The resulting modified support included 1.7 wt % $TiO_2$ (based on the total weight of the modified support).

Example 1: TALH EDF with Citric Acid (AP15-171)

38.8 g Puralox SCCa-150 was suspended in 46.5 g water to obtain a 45.5 wt % $Al_2O_3$ in water suspension. 11.2 g of 40 wt-% citric acid solution was added to the suspension to adjust the pH of the suspension to a pH of 4 producing an acid modified alumina suspension. 164 g of a 1 wt-% $TiO_2$ aqueous TALH solution was then added to the acid modified alumina suspension and the alumina/titanium compound suspension was heated for 3 h at 50° C. under a pH control of 4 using citric acid, filtered, dried and calcined at 550° C. The resulting catalyst support included 2.2 wt % $TiO_2$ (based on the total weight of the modified support).

The Examples show that the addition of an acid to the alumina suspension before the addition of the Ti compound results in a much higher $TiO_2$ adsorption on the alumina when compared to no acid treatment or to premixing of the acid with the Titania ($TiO_2$) as per Comparative Examples 1 and 2.

The Ti:Al ratios for the particle as is and the ground (crushed) sample of the catalyst support as prepared in Example 1 are found to be nearly the same and therefore the titania surface distribution is considered to be homogeneous across the inner and outer surface of the support particle. Functionalising the alumina support with an acid, in this case citric acid prior to TALH EDF impregnation as in Example 1 resulted in a homogenous Ti distribution (see Table 1, Example 1 XPS Ti:Al peak ratios) compared to Comparative Example 2 where the titanium compound and carboxylic acid were contacted with the catalyst support at the same time without prior treatment of the catalyst support material with an acid where an inhomogeneous Ti distribution was obtained.

The support modification results demonstrate that the improvement in adsorption is a function of pH as well as the fact that the surface of the alumina is functionalised by the acid.

The results are included in Table 1 hereunder:

TABLE 1

| XPS and ICP analysis of TALH EDF impregnation | | | | | |
|---|---|---|---|---|---|
| | $TiO_2$ | XPS peak area ratio of Ti:Al* | | Difference between | |
| Example | (wt.-%), Target $TiO_2$ = 4.1 | particle as is | crushed sample | particle as is and crushed sample | Distribution XPS |
| Comparative Example 1 | 1.1 | 0.2365 | 0.0184 | 0.2181 | inhomogeneous |
| Comparative Example 2 | 1.7 | 0.0502 | 0.0165 | 0.0337 | Inhomogeneous |
| Example 1 | 2.2 | 0.0264 | 0.0197 | 0.0067 | homogeneous |

Examples—Options 3 and 4 of the First Aspect of the Invention

As described hereinbefore options 3 and 4 of the first aspect of the invention include the step of drying the acid modified alumina suspension before addition of the titanium compound solution (known as Incipient Wetness hereinafter "IW")).

Comparative Example 3: TALH, IW with No Acid Addition 13.7 g TALH was dissolved in water to obtain a resultant 21 mL aqueous TALH solution. The TALH solution was then added dropwise to a 54.4 g Puralox SCCa-2/150 suspension during intensive mixing. The water was removed under atmospheric pressure at 80° C. and calcined at 550° C. for 3 hours. The resulting catalyst support included 4.1 wt % $TiO_2$, but the $TiO_2$ distribution was inhomogeneous (see Table 2 and FIG. 1).

Comparative Example 4: 1-Step TALH IW with 20 wt-% Citric Acid (Expressed in Relation to TALH) (Premixing)

11.3 g TALH was dissolved in water to obtain a resultant 18 mL aqueous TALH solution. 2.3 g citric acid was added to the TALH solution as a solid. This solution was added to a 38.8 g Puralox SCCa-2/150 suspension under intensive mixing. The water was removed under atmospheric pressure at 80° C. and calcined at 550° C. for 3 hours. The resulting catalyst support had an inhomogeneous distribution of $TiO_2$.

Example 2: 2-Step: 20 wt-% Citric Acid, Drying, TALH IW 18 mL of a 20 wt.-% citric acid solution was added to 38.8 g Puralox SCCa-2/150 suspension and allowed to mix. The mixture was dried at 80° C. under atmospheric pressure. 11.3 g TALH was dissolved in water to obtain an 18 mL aqueous TALH solution. This solution was added to the dried acid-modified Puralox mixture to form an alumina/titanium compound suspension. This alumina/titania compound suspension is then dried at 80° C. to remove the water and calcined at 550° C. for 3 hours to obtain a catalyst support including 4.1 wt % $TiO_2$ with a homogeneous $TiO_2$ dispersion.

Example 3—2-Step: 5 wt-% Citric Acid, Drying, TALH IW

A modified alumina support with 4.1 wt % $TiO_2$ was prepared as described in Example 2, however, the Puralox was treated with a 5 wt.-% citric acid solution. The homogeneity of the dispersed $TiO_2$ on the modified support was good as per Table 2 and FIG. 2.

Example 4: 2-Step: 10 wt-% Lactic Acid, Drying, TALH IW

To 29.2 g Puralox SCCa-150 suspension, 14 mL of a 10 wt.-% lactic acid solution was added and allowed to mix. The mixture was dried at 80° C. under atmospheric pressure. 8.5 g TALH was dissolved in water to obtain a 14 mL aqueous TALH solution. This was added to the dried acid-treated Puralox mixture to form an alumina/titanium compound suspension. The alumina/titanium compound suspension was then dried at 80° C. to remove the water and calcined at 550° C. for 3 hours to obtain a catalyst support of 4.1 wt % $TiO_2$ with a homogeneous Ti compound dispersion.

Example 5—2-Step: 5 wt-% Lactic Acid, Drying, TALH IW

To 29.1 g Puralox SCCa-150 suspension, 13 mL of a 5 wt.-% lactic acid solution was added and allowed to mix. The mixture was dried at 80° C. under atmospheric pressure. 8.5 g TALH was dissolved in water to obtain a 13 mL aqueous TALH solution. This was added to the dried acid-treated Puralox mixture as prepared in the 1st step to form an alumina/titanium compound suspension. The alumina/titanium compound suspension was dried at 80° C. to remove the water and calcined at 550° C. for 3 hours. The homogeneity of the dispersed $TiO_2$ on the catalyst support was good.

As per the examples and as outlined in Table 2 adding an acid to the alumina suspension prior to contacting the alumina suspension or mixture with the titanium compound (TALH), that is, a 2 step treatment process showed that the $TiO_2$ adsorption can be significantly improved and the titania is uniformly distributed on the inner and outer surfaces of the alumina support.

TABLE 2

XPS and ICP analysis of TALH IW impregnation:

| Example | $TiO_2$ (wt.-%) | XPS peak area ratio of Ti:Al* Particle as is | crushed sample | Difference between particle as is and crushed sample | Distribution XPS |
|---|---|---|---|---|---|
| Comparative Example 3 | 4.1 | 0.3515 | 0.0321 | 0.3194 | Inhomogeneous |
| Comparative Example 4 | 4.1 | 0.0596 | 0.0302 | 0.0294 | Inhomogeneous |
| Example 2 | 4.1 | 0.0119 | 0.0294 | −0.0175 | Homogeneous |
| Example 3 | 4.1 | 0.0192 | 0.0305 | −0.0113 | Homogeneous |
| Example 4 | 4.1 | 0.0245 | 0.0300 | −0.0055 | Homogeneous |
| Example 5 | 4.1 | 0.0392 | 0.0309 | −0.0083 | Homogeneous |

Examples for the Fourth Aspect of the Invention

Mn Impregnation Examples

Comparative Example 5: TALH IW with No Acid Addition Pretreatment, MnAc IW

A catalyst support was prepared as described in Comparative Example 3 but manganese acetate (MnAc) was added by incipient wetness after calcination.

26.9 g TALH was dissolved in water to obtain a resultant 42 mL aqueous TALH solution. This was added dropwise to 91, 8 g Puralox SCCa-150 and allowed to mix with a Krups stirrer. The water was removed under atmospheric pressure at 120° C. and calcined at 550° C. for 3 hours. 12, 5 g manganese acetate tetrahydrate (Mn $(CH_3COO)_2.4H2O$) was dissolved in 42 mL water and added dropwise to the calcined powder. The catalyst support was dried at 120° C. and calcined again for 3 h at 550° C. to obtain a catalyst comprising of 3.9 wt % $TiO_2$ and 4.7 wt % $MnO_2$.

Comparative Example 6: 1 Step TALH IW with 20 wt-% Citric Acid, MnAc IW

A catalyst support was prepared as described in Comparative Example 4 but with the addition of manganese acetate (MnAc) in a second incipient wetness step after drying.

22.8 g TALH was dissolved in water to obtain a resultant 36 mL aqueous TALH solution. 4.6 g citric acid was added to the TALH solution as a solid. This solution was added dropwise to 78 g Puralox SCCa-2/150 while mixing with a Krups stirrer. The water was removed under atmospheric pressure at 120° C. 10.6 g manganese acetate tetrahydrate was dissolved in 36 mL water and added dropwise to this dried powder, dried at 120° C. at atmospheric pressure and calcined for 3 h at 550° C. in air. The modified support comprised of 3.9 wt % $TiO_2$ and 4.7 wt % $MnO_2$ Comparative Example 7: 1 Step TALH IW, MnAc IW with 20 wt-% Citric Acid A catalyst support was prepared as described in Comparative Example 4 but with MnAc addition during the TALH-citric acid-IW:

22.8 g TALH, 10.6 g manganese acetate tetrahydrate and 4.6 g citric acid were dissolved in water to obtain a resultant 36 mL aqueous solution. This solution was added dropwise to 78 g Puralox SCCa-2/150 while mixing with a Krups stirrer. The water was removed under atmospheric pressure at 120° C. and the powder was calcined for 3 h at 550° C. in air. The modified support comprised of 3.9 wt % $TiO_2$ and 4.7 wt % $MnO_2$.

Example 6: 2-Step: TALH and MnAc IW with 5 wt-% Citric Acid Pretreatment

A catalyst support was prepared as described in Example 3 but with MnAc addition during the TALH-citric acid-incipient wetness:

To 73.9 g Puralox SCCa-2/150 34 mL, 5 wt.-% citric acid solution was added and allowed to mix. The mixture was dried at 80° C. under atmospheric pressure. 21.5 g TALH and 10 g manganese(II)acetate tetrahydrate (Mn($CH_3COO$)$_2.4H_2O$) was dissolved in water to obtain a 34 mL aqueous TALH/Mn acetate solution.

To the dried acid-treated Puralox, as prepared in the $1^{st}$ step, the aqueous TALH/MnAc solution was added in a $2^{nd}$ step impregnation, dried at 80° C. to remove the water and calcined at 550° C. for 3 hours to obtain a modified support of 4.1 wt % $TiO_2$ and 4.7 wt % $MnO_2$. Drying was performed at 80° C. to prevent large acid losses during drying.

Example 7: 2-Step: TALH EDF, 5 wt-% Citric Acid and Mn Acetate IW

A catalyst support was prepared as described in Example 1 but with MnAc addition by incipient wetness after calcination:

An $Al_2O_3$ in water suspension was prepared by mixing 85.8 g Puralox SCCa-2/150 with 102 mL water, the suspension was adjusted to pH 4 by a 40 wt % citric acid solution. 950 g of a 1 wt-% $TiO_2$ aqueous TALH solution was thereafter added to the suspension and heated to 50° C. for 3 hours under a pH control of 4 using citric acid. The suspension was filtered, dried and calcined at 550° C. After calcination, 12.4 g manganese acetate tetrahydrate was dissolved in 43 mL water and added dropwise to the powder, dried at 120° C. and calcined 3 hours at 550° C.

The XPS peak ratio results for Comparative Example 5 and Example 6 are included in Table 3 for the Ti and Mn modified sample prepared via the incipient wetness route show that the titania is predominantly located on the inner surfaces of the supports while the manganese is uniformly located on the inner and outer surfaces of the support.

The Results are included in Table 3 hereunder:

TABLE 3

XPS and ICP anaysis of $Mn(CH_3COO)_2 \cdot 4H_2O$ IW impregnation

| Example | XPS peak area ratio of Mn:Al | XPS peak area Mn:Al for the crushed sample | Difference between particle as is and crushed sample | $MnO_2$ (wt.-%) |
|---|---|---|---|---|
| Comparative Example 5 | 0.1712 | 0.0640 | 0.1072 | 4.5 |
| Example 6 | 0.0399 | 0.0459 | −0.006 | 4.4 |

The invention claimed is:

1. A method of preparing a catalyst support, the method comprising the following steps:
   i) preparing an alumina suspension, the alumina suspension having a pH of between 6 and 8, wherein the alumina suspension comprises an alumina selected from the group consisting of transition alumina, boehmite and mixtures thereof;
   ii) preparing a titanium compound solution;
   iii) adding an acid to the alumina suspension until the pH of the alumina suspension is between 4 and 5 to form an acid modified alumina suspension;
   iv) adding the titanium compound solution to the acid modified alumina suspension to form an alumina/titanium compound suspension; and
   v) drying and calcining the alumina/titanium compound suspension to form the catalyst support.

2. The method according to claim 1 comprising the further step of adding an acid to the alumina/titanium compound suspension.

3. The method according to claim 2 comprising the further step of heating the alumina/titanium compound suspension.

4. The method according to claim 1 comprising the further step of drying the acid modified alumina suspension before adding the titanium compound solution.

5. The method according to claim 4, wherein the acid added is a carboxylic acid selected from the group consisting of formic acid, lactic acid, citric acid, and mixtures thereof.

6. The method according to claim 1, wherein the acid added to the alumina suspension is formic acid, lactic acid, citric acid, or mixtures thereof.

7. The method of claim 1, wherein the alumina/titanium compound suspension comprises 99 to 95 wt. % alumina, calculated as $Al_2O_3$, and 1 to 5 wt. % titanium compounds, calculated as $TiO_2$, relative to sum of alumina, calculated as $Al_2O_3$, and titanium compounds, calculated as $TiO_2$.

8. The method of claim 1, wherein the percentage of acid added to the alumina suspension is between 5 to 30 wt % of the acid modified alumina suspension.

9. The method according to claim 1, wherein the transition alumina is γ-alumina, δ-alumina, θ-alumina or mixtures thereof.

10. The method according to claim 1, wherein the titanium compound solution is made by dissolving a titanium precursor in at least water.

11. The method according to claim 10, wherein the titanium precursor is a water-soluble titanium precursor selected from the group consisting of potassium titanium oxalates, ammonium titanium oxalates, ammonium titanium lactates, and mixtures thereof.

12. A method of preparing a promoted catalyst support, the method comprising:
   i) preparing a catalyst support according to claim 1, and
   ii) introducing a promoter onto and/or into the catalyst support thereby to obtain a promoted catalyst support.

13. The method according to claim 1 comprising the further step of heating the alumina/titanium compound suspension.

14. A calcined catalyst support comprising an alumina support coated with between 1 and 5 wt. % $TiO_2$ in relation to the alumina support ($Al_2O_3$), the TiO2 being homogeneously dispersed on the alumina support.

* * * * *